MEMORY NOISE CANCELLATION
Filed May 3, 1961
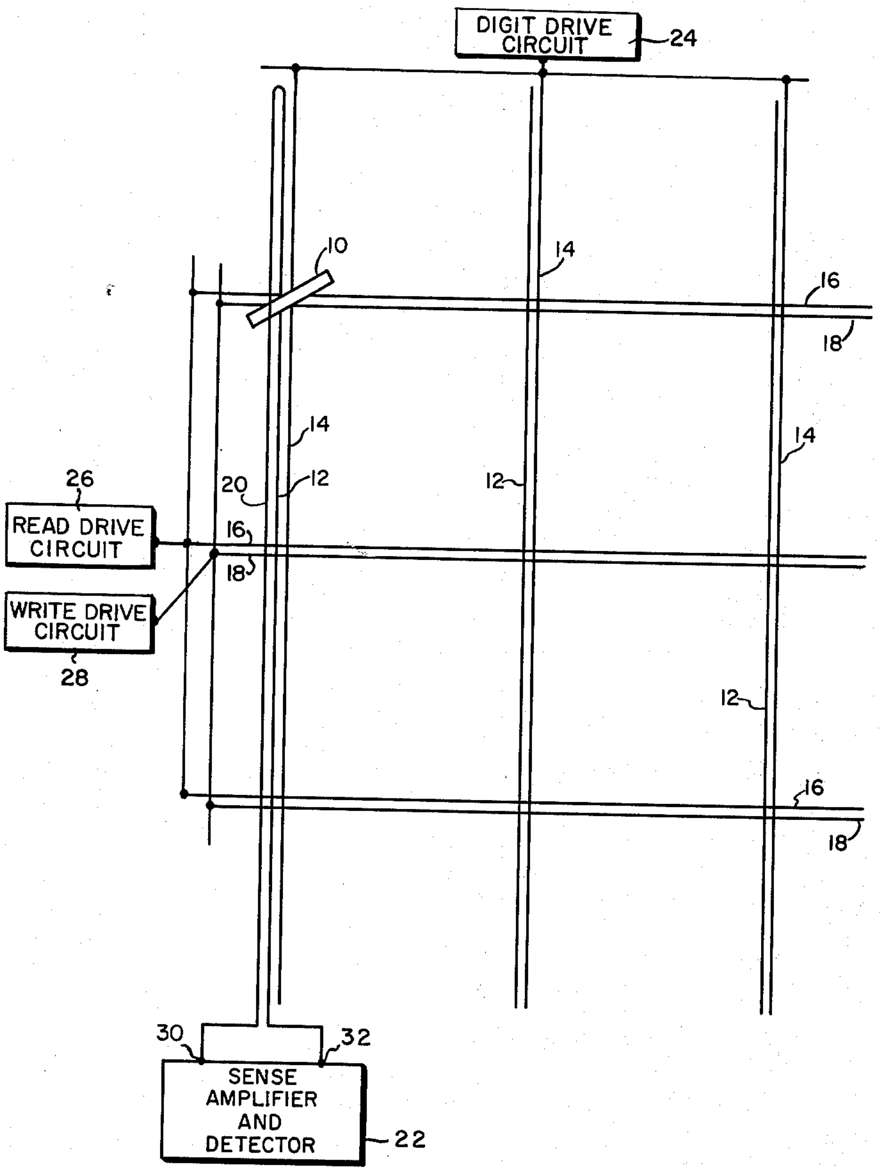
INVENTOR.
HERBERT A. ULLMAN
BY
ATTORNEY United States Patent Office 3,193,809 Patented July 6, 1965

3,193,809

MEMORY NOISE CANCELLATION

Herbert A. Ullman, Burlington, Mass., assignor to Sylvania Electric Products Inc., a corporation of Delaware Filed May 3, 1961, Ser. No. 107,553
2 Claims. (Cl. 340—174)

This invention is concerned with electronic data processing equipment and more particularly with noise cancellation in memories using magnetic cores, thin films, or other storage elements and having orthogonal arrays of windings.

In memory systems having orthogonal windings, the read and sense conductors are mutually perpendicular as they link storage elements at their intersection. It is essential, however, that there be no capacitive and inductive coupling noise or other crosstalk between these conductors when a read pulse causes an output in the sense winding.

Existing systems such as that disclosed in co-pending United States patent application S.N. 67,544, Noise Cancellation in Linear Selection Memories, filed by Ullman and Stern on November 7, 1960, and now U.S. Patent No. 3,155,946, and assigned to Sylvania Electric Products Inc., concern themselves with noise cancellation between parallel windings such as the digit drive and the sense winding. Other noise canceling systems are concerned with canceling the noise due to partial changes in the memory element (e.g. the core) in high speed memory systems. These techniques, however, do not cancel all of the noise in the system.

Accordingly, a primary object of this invention is to provide an improved memory system for electronic data processing equipments, and particularly one in which undesired noise spikes caused by inductive and capacitive crosstalk between mutually perpendicular windings are effectively canceled.

These and related objects are accomplished in one illustrative embodiment of the invention which will be described as featuring a means for obtaining in an auxiliary sense winding the same noise both in waveform shape and amplitude as appears on the sense winding and then adding this simulation signal to the sense detection and amplifier circuits in such a manner as to cancel the noise appearing on the sense winding.

Other objects, features, and modifications of the invention will be apparent from the following more detailed description of the illustrative embodiment shown in the accompanying drawing, wherein:

FIG. 1 is a diagrammatic sketch showing a memory plane wired in accordance with the invention.

The diagram of FIG. 1 shows a plurality of storage elements 10, representing corresponding digits or bits, linked by sense windings 12, digit drive windings 14 having drive circuit 24, read windings 16 having drive circuit 26, and write windings 18 having drive circuit 28.

The basic arrangement of the component storage elements and operation of an illustrative linear selection core memory system is explained in co-pending United States patent application S.N. 65,993, filed October 31, 1960 and now abandoned, also assigned to Sylvania Electric Products Inc. This patent application may be consulted for a detailed description of the physical arrangement and electrical operation of magnetic core memory systems of the linear selection type. Briefly summarizing, the operation of linear selection magnetic core memories, they comprise a plurality of ferrite cores connected in a matrix arrangement. A memory writing operation is carried out by coincident pulses in a row $x$ and a column $y$ conductor, which $x$ and $y$ coordinates define the location of an individual memory core; and the read operation is performed by applying a pulse to the $x$ winding which pulse causes all cores linked by that winding to provide an output via their associated sense windings. One level of output in the sense windings defines a binary "0" wheeras a different level defines a binary "1." It is necessary that the difference between these levels be sufficiently pronounced so that the states of storage elements are detectable.

The presence of a core, or other memory element 10, at the intersection of orthogonal windings, such as the sense winding 12 and the read winding 16, causes inductive and capacitive crosstalk or interference between the windings during an interrogation operation in the memory plane. If an auxiliary winding 20 is added in close proximity and parallel to the sense winding 12, it experiences approximately the same noise as a result of inductive and capacitive coupling from the read winding 16 as does the sense winding 12. This auxiliary winding is electrically connected at one end to the sense winding 12 and at the other end to a sense signal detection circuit (not shown) in the sense amplifier and detector unit 22, which has input terminals 30 and 32. It may be observed in FIG. 1 that the auxiliary winding 20 does not link the storage elements 10 as does the sense winding 12. In this way its output to the detection circuit is the algebraic sum of the outputs from sense winding 12 and auxiliary winding 20, which algebraic sum is the desired output from the storage element 10 since noise caused by electro-magnetic fields in proximity with windings 12 and 20 have canceled each other because of the difference in polarity between the sense winding 12 and the auxiliary winding 20.

In this manner noise or crosstalk between orthogonal windings which becomes appreciable in high speed memory operation is canceled. The described noise cancellation technique also corrects crosstalk caused by imperfect orthogonality of memory windings, wherein components of noise from each of the orthogonal windings are eliminated by adjusting the physical direction of auxiliary winding 20 in conformance with the angle by which intended orthogonality is imperfect.

It will be appreciated that, although this description has been limited to a discussion of a single paired orthogonal combination of a single sense winding and a single read winding, additional pairs of these windings are involved in other digit readouts and an additional auxiliary winding is required for each sense winding.

The invention has been described with reference to a particular illustrative embodiment. It is not limited, however, to the specific details of the preceding description but embraces the full scope of the following claims.

What is claimed is:

1. In a memory system having storage elements at the intersection of coordinate conductors: a group of storage elements; a sense winding linking said group of storage elements; a digit drive winding also linking said group of storage elements; a write winding perpendicular to said sense and digit drive windings and also linking said storage elements; read windings parallel to said write windings and also linking said storage elements; drive circuits for pulsing said digit drive, read, and write windings; detection circuitry connected to said sense windings; and, auxiliary windings in close enough proximity with said sense windings so that both are affected by the same electromagnetic fields caused by said read windings, and arranged so that a uni-polar inductive and capacitative signal in said sense windings become bi-polar when applied to said detection circuitry with a net effect of substantial self-cancellation.

2. Electronic data processing apparatus comprising: a first plurality of conductors arranged in $x$-coordinate rows; a second plurality of conductors arranged in $y$ coordinate columns substantially orthogonal to said $x$-coordinate conductors; a plurality of memory elements each individually linking an intersection of an $x$- and a $y$-coordinate conductor; a third plurality of conductors, one corresponding to each of said $y$-coordinate conductors; each individual conductor of said third plurality lying substantially parallel to a separate conductor of said second plurality and in close physical proximity thereto so as to experience substantially the same inductive and capacitive coupling to conductors of said first plurality except that conductors of said third plurality do not link said memory elements in the same manner as the conductors of said second plurality; a plurality of signal differential amplifiers, each including first and second input terminals and means for amplifying the difference in amplitude of signal inputs connected to them; means connecting one end of each one of said second plurality of conductors to said first terminal of a separate one of said amplifiers; means connecting one end of each one of said third plurality of conductors to said second terminal of a separate one of said amplifiers; proximate ones of said second and third conductor combinations being connected to the same one of said amplifiers; and, means for providing that each pair of said conductors connected to the same amplifier are electrically continuous so that they provide a continuous conductor connected between the first and second terminals of the amplifier.

References Cited by the Examiner

UNITED STATES PATENTS

| | | | |
|---|---|---|---|
| 2,691,154 | 10/54 | Rajchman | 340—174 |
| 2,889,540 | 6/59 | Bauer et al. | 340—174 |

IRVING L. SRAGOW, *Primary Examiner.*